(12) United States Patent
Vogt et al.

(10) Patent No.: US 9,022,321 B2
(45) Date of Patent: May 5, 2015

(54) DECOMPRESSION ARRANGEMENT FOR AN AIRCRAFT INCLUDING A BI-DIRECTIONAL FLAP

(75) Inventors: Jürgen Vogt, Buchholz in der Nordheide (DE); Katja Strobel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 597 days.

(21) Appl. No.: 13/401,937

(22) Filed: Feb. 22, 2012

(65) Prior Publication Data

US 2012/0214393 A1 Aug. 23, 2012

Related U.S. Application Data

(60) Provisional application No. 61/445,090, filed on Feb. 22, 2011.

(30) Foreign Application Priority Data

Feb. 22, 2011 (DE) .......................... 10 2011 011 976

(51) Int. Cl.
| | |
|---|---|
| *B64C 1/14* | (2006.01) |
| *B64C 1/06* | (2006.01) |
| *B64D 13/04* | (2006.01) |
| *B64C 1/18* | (2006.01) |
| *B64C 1/00* | (2006.01) |

(52) U.S. Cl.
CPC ........... *B64C 1/066* (2013.01); *B64C 2001/009* (2013.01); *B64D 13/04* (2013.01); *B64C 1/18* (2013.01)

(58) Field of Classification Search
USPC ......................... 244/118.5, 119, 129.1, 129.4; 454/70–76, 83–87
See application file for complete search history.

(56) References Cited

U.S. PATENT DOCUMENTS

| | | | | |
|---|---|---|---|---|
| 2,912,724 | A | * | 11/1959 | Wilkes .......................... 52/302.3 |
| 4,033,247 | A | * | 7/1977 | Murphy ........................... 454/76 |
| 4,383,666 | A | | 5/1983 | Allerding et al. |
| 4,390,152 | A | * | 6/1983 | Jorgensen ................... 244/118.5 |
| 4,432,514 | A | | 2/1984 | Brandon |

(Continued)

FOREIGN PATENT DOCUMENTS

| | | |
|---|---|---|
| DE | 10 2004 038 860 A1 | 2/2006 |
| EP | 0 260 348 A1 | 3/1988 |
| EP | 0 420 306 A1 | 4/1991 |

*Primary Examiner* — Tien Dinh
*Assistant Examiner* — Michael A Fabula
(74) *Attorney, Agent, or Firm* — Carter, DeLuca, Farrell & Schmidt, LLP (57) ABSTRACT

A decompression arrangement includes first and second cabin lining elements each with an edge region, the edge region of the second being arranged at a smaller distance from an aircraft outer skin than the edge region of the first, an air discharge opening arranged between the first edge region and second edge region and which is adapted to discharge air from an inner region of the cabin delimited by the cabin lining elements into a region of the aircraft lying between the cabin lining elements and the aircraft outer skin, and a decompression element integrated in the second cabin lining element having a flap pivotable about an axis from a closed position, in which it closes a pressure equalizing opening formed in the decompression element, into a first open position, in which it opens the pressure equalizing opening if a first predetermined differential pressure acts on the decompression element.

10 Claims, 3 Drawing Sheets

(56) References Cited

U.S. PATENT DOCUMENTS

| | | | |
|---|---|---|---|
| 4,646,993 A * | 3/1987 | Baetke | 244/117 R |
| 4,703,908 A * | 11/1987 | Correge et al. | 244/118.5 |
| RE32,554 E * | 12/1987 | Murphy | 244/118.5 |
| 4,899,960 A * | 2/1990 | Hararat-Tehrani et al. | 244/118.5 |
| 5,085,017 A * | 2/1992 | Hararat-Tehrani | 52/1 |
| 5,118,053 A * | 6/1992 | Singh et al. | 244/118.5 |
| 5,137,231 A * | 8/1992 | Boss | 244/118.5 |
| 6,129,312 A | 10/2000 | Weber | |
| 6,264,141 B1 | 7/2001 | Shim et al. | |
| 6,435,455 B1 * | 8/2002 | Holman et al. | 244/118.5 |
| 7,624,732 B2 * | 12/2009 | Mitchell et al. | 128/202.24 |
| 7,654,487 B2 * | 2/2010 | Ghoreishi et al. | 244/118.5 |
| 7,721,992 B2 * | 5/2010 | Keeler et al. | 244/119 |
| 8,201,775 B2 | 6/2012 | Treimer et al. | |
| 8,240,604 B2 * | 8/2012 | Opp et al. | 244/118.5 |
| 8,393,577 B2 * | 3/2013 | Roth et al. | 244/129.5 |
| 8,490,922 B2 | 7/2013 | Benthien et al. | |
| 8,567,721 B2 * | 10/2013 | Voss et al. | 244/129.4 |
| 2003/0168553 A1 * | 9/2003 | Diehl et al. | 244/129.1 |
| 2008/0217478 A1 * | 9/2008 | Keeler et al. | 244/119 |
| 2008/0290217 A1 * | 11/2008 | Ghoreishi et al. | 244/129.4 |
| 2009/0159748 A1 * | 6/2009 | Treimer et al. | 244/129.4 |
| 2009/0179110 A1 | 7/2009 | Leyens | |
| 2010/0187358 A1 | 7/2010 | Voss et al. | |
| 2010/0320318 A1 | 12/2010 | Roth et al. | |
| 2012/0043421 A1 | 2/2012 | Voss et al. | |

* cited by examiner

FIG. 3

DECOMPRESSION ARRANGEMENT FOR AN AIRCRAFT INCLUDING A BI-DIRECTIONAL FLAP

TECHNICAL FIELD

The invention relates to a decompression arrangement provided for use in an aircraft, for example a passenger aircraft.

BACKGROUND

Passenger aircraft which are used at present comprise a pressurised cabin, the internal pressure of which in flight is kept at an increased pressure level compared with the ambient pressure, i.e. the reduced atmospheric pressure at great heights, for example by an air-conditioning system which is fed with engine bleed air. In general, the pressure within the cabin of a passenger aircraft when the aircraft is in flight, i.e. when the aircraft is at cruising altitude, usually corresponds approximately to the atmospheric pressure at a height of 8000 feet (about 2400 m). The air-conditioning air provided by the aircraft air-conditioning system is usually fed into the cabin through air inlet duets, which open into the cabin above the passenger seats in the region of ceiling lining panels and/or side lining panels of the cabin lining. Exhaust air is usually discharged from the cabin through air outlet ducts, which are arranged in the region of a cabin floor or a section of the side lining panels near the floor. In order to avoid damage to the cabin lining, in particular to the side lining panels, in the event of a decompression, i.e. in the event of a pressure drop in a region of the aircraft cabin which is kept at increased pressure during flight, a mutual pressure equalisation, between an inner region of the aircraft cabin which is delimited by the side lining panels of the cabin lining, and a region of the aircraft lying between the side lining panels of the cabin lining and the aircraft outer skin, must be possible in the event of decompression.

From DE 10 2009 012 015 A1 there is known a dado panel with an integrated flap mechanism which, in the event of a sudden pressure drop in the region of the aircraft lying between the side lining panels of the cabin lining and the aircraft outer skin, opens a pressure equalising opening, through which air can flow out of the inner region of the aircraft cabin delimited by the side lining panels into the region of the aircraft between the side lining panels and the aircraft outer skin, which is affected by the decompression. In the event of a decompression in the inner region of the aircraft cabin delimited by the side lining panels, by contrast, an air outlet duct which serves, in the normal operation of the aircraft, to discharge exhaust air from the interior of the cabin into the region of the aircraft lying between the side lining panels and the aircraft outer skin is utilised to lead air out of the region of the aircraft lying between the side lining panels and the aircraft outer skin into the inner region of the aircraft cabin affected by the sudden pressure drop and thereby ensure a pressure equalisation between the inner region of the aircraft cabin and the region of the aircraft lying between the side lining panels and the aircraft outer skin.

The air outlet duct cannot, however, then be optimised only with regard to its function as an exhaust air discharge duct in the normal operation of the aircraft, but must be designed such that it enables, in the event of decompression, a sufficiently rapid pressure equalisation between the inner region of the aircraft cabin affected by the decompression and the region of the aircraft delimited by the side lining panels and the aircraft outer skin. Depending on the design of the aircraft cabin, this may be feasible only with difficulty or not at all. In any case, an air outlet duct which serves both as an exhaust air discharge duct and as a pressure equalising duct usually has a large structural volume and relatively poor acoustic properties. This may lead to impairment of the comfort of the passengers in the aircraft cabin.

The invention is directed at the object of providing a space-savingly constructed decompression arrangement for an aircraft which, in the event of a sudden pressure drop in a region of the aircraft lying between the side lining panels of the cabin lining and the aircraft outer skin or an inner region of the aircraft cabin delimited by the side lining panels, can ensure a correct mutual pressure equalisation between the aircraft region lying between the side lining panels and the aircraft outer skin and the inner region of the aircraft cabin delimited by the side lining panels.

SUMMARY

To achieve this object, a decompression arrangement for an aircraft according to the invention comprises a first cabin lining element with an edge region and a second cabin lining element with an edge region. The edge region of the second cabin lining element is arranged at a smaller distance from an aircraft outer skin than the edge region of the first cabin lining element. Arranged between the edge region of the first cabin lining element and the edge region of the second cabin lining element is an air discharge opening which is adapted, in the normal operation of the aircraft, to discharge air from an inner region of the cabin delimited by the cabin lining elements into a region of the aircraft lying between the cabin lining elements and the aircraft outer skin. The air discharge opening arranged between the edge regions of the first and the second cabin lining element preferably has a through-flow cross-sectional area which corresponds to total area delimited by the edge regions of the first and the second cabin lining element.

The decompression arrangement according to the invention further comprises a decompression element, which is integrated in the second cabin lining element and has a flap which is pivotable about an axis from a closed position, in which it closes a pressure equalising opening formed in the decompression element, in a first direction, that is to say in the direction of the aircraft outer skin, into a first open position, in which it opens the pressure equalising opening formed in the decompression element if a first predetermined differential pressure acts on the decompression element. In its first open position, the flap of the decompression element enables a pressure equalisation between the inner region of the cabin delimited by the cabin lining elements and the region of the aircraft lying between the cabin lining elements and the aircraft outer skin if the region of the aircraft lying between the cabin lining elements and the aircraft outer skin is affected by a sudden pressure drop and consequently air has to be discharged from the inner region of the cabin delimited by the cabin lining elements into the aircraft region lying between the cabin lining elements and the aircraft outer skin.

The flap of the decompression element furthermore is pivotable about the axis in a second direction opposite the first direction, that is to say in the direction of the first cabin lining element, into a second open position, in which it opens the pressure equalising opening formed in the decompression element if a second predetermined differential pressure acts on the decompression element. In its second open position, the flap of the decompression element enables a pressure equalisation between the inner region of the cabin delimited by the cabin lining elements and the region of the aircraft lying between the cabin lining elements and the aircraft outer skin if a sudden pressure drop occurs in the inner region of the cabin delimited by the cabin lining elements and consequently air has to be discharged from the region of the aircraft lying between the cabin lining elements and the aircraft outer skin into the inner region of the cabin delimited by the cabin lining elements. The decompression element of the decompression arrangement according to the invention consequently enables a mutual pressure equalisation between the inner region of the cabin delimited by the cabin lining elements and the aircraft region lying between the cabin lining elements and the aircraft outer skin.

The decompression element of the decompression arrangement according to the invention is positioned relative to the first and the second cabin lining elements in such a manner that the flap in its second open position keeps clear a through-flow cross-section of the air discharge opening, that is to say leaves the through-flow cross-section of the air discharge opening unaffected. Thus, in the event of a sudden pressure drop in the inner region of the cabin delimited by the cabin lining elements, not only the pressure equalising opening formed in the decompression element, but also the air discharge opening which, in the normal operation of the aircraft, serves to discharge air from the inner region of the cabin into the aircraft region lying between the cabin lining elements and the aircraft outer skin can be utilised to supply air from the aircraft region lying between the cabin lining elements and the aircraft outer skin into the inner region of the cabin affected by the decompression. Both the pressure equalising opening of the decompression arrangement and the air discharge opening can then be dimensioned smaller than would be possible if solely the pressure equalising opening or solely the air discharge opening would have to ensure a pressure equalisation between the inner region of the cabin delimited by the cabin lining elements and the aircraft region lying between the cabin lining elements and the aircraft outer skin. As a result, the cabin width available to the passengers can be maximised without impairing the pressure equalising function of the decompression arrangement in the event of decompression. The decompression arrangement according to the invention thus enables an improvement of the comfort for the passengers on board the aircraft without having to accept functional losses of the decompression arrangement for this purpose.

In a preferred embodiment of the decompression arrangement according to the invention, a surface region of the first cabin lining element adjoining an edge region of the first cabin lining element extends from the edge region of the first cabin lining element in a first direction. A surface region of the second cabin lining element adjoining the edge region of the second cabin lining element extends, by contrast, preferably from the edge region of the second cabin lining element in a second direction opposite the first direction.

The first cabin lining element may, for example, be a side lining panel, in particular a dado panel, the edge region of which, in the state of the decompression arrangement when mounted in an aircraft, faces a floor of the aircraft cabin and extends along a longitudinal axis of the aircraft at a substantially constant distance from the floor of the aircraft. The second cabin lining element may, for example, be a floor delimiting element which, in the state of the decompression arrangement when mounted in an aircraft, extends from the floor of the aircraft cabin upwards in the direction of the dado panel.

The edge region of the second cabin lining element facing the first cabin lining element can extend along the longitudinal axis of the aircraft substantially parallel to the floor of the aircraft cabin and/or be arranged in a plane with the edge region of the first cabin lining element. Alternatively to this, the first and the second cabin lining element can, however, also be shaped and/or arranged such that the second cabin lining element reaches behind the first cabin lining element, i.e. the edge region of the second cabin lining element, viewed from an interior of the aircraft cabin, is positioned behind the first cabin lining element. Finally, an arrangement is also conceivable in which the edge region of the second cabin lining element is arranged below the edge region of the first cabin lining element, i.e. is spaced from the edge region of the first cabin lining element also in a direction substantially parallel to the aircraft outer skin.

The axis, about which the flap of the decompression element is pivotable from its closed position into its first or its second open position, is preferably arranged in the surface region of the second cabin lining element adjoining the edge region of the second cabin lining element. Such an positioning of the pivot axis enables the flap to be brought into its second open position without reducing the through-flow cross-section of the air discharge opening arranged between the edge regions of the cabin lining elements in the process.

Preferably, the flap of the decompression element forms in its second open position an angle greater than 90° with the edge region of the second cabin lining element. Such a configuration of the flap ensures that the flap keeps clear the through-flow cross-section of the air discharge opening also when it is in its second open position.

The flap of the decompression element can be prestressed, for example by means of a spring, into its closed position, in which it closes the pressure equalising opening between the cabin of the aircraft and the region of the aircraft lying between the cabin lining elements and the aircraft outer skin. If required, a plurality of springs, for example two springs, may also be present, which prestress the flap into its closed position, counter to the pivoting direction of the flap about the axis into its first open position or counter to the pivoting direction of the flap about the axis into its second open position. By a suitable choice of the spring(s) or of the spring force provided by the spring(s), it is then possible in a simple manner to set the differential pressures at which the flap in the event of decompression opens the pressure equalising opening between the cabin of the aircraft and the region of the aircraft lying between the cabin lining elements and the aircraft outer skin.

In a preferred embodiment of the decompression arrangement according to the invention, the flap of the decompression element cooperates in its second open position with a stop element. The pivoting movement of the flap from its closed position into its second open position is then reliably limited. In particular, the deflection of the flap becomes independent of the pressure difference acting on the flap. This ensures that the flap in its second open position leaves the through-flow cross-section of the air discharge opening unaffected even if a higher second differential pressure acts on the decompression element.

The stop element can, for example, be fastened to the second cabin lining element and comprise a first section extending from the second cabin lining element in the direction of the first cabin lining element. Preferably, the first section of the stop element forms an angle >90° with the edge region of the second cabin lining element. Such a configuration of the stop element ensures that a sufficiently large through-flow cross-section of the air discharge open is always present. Furthermore, the stop element can act as a flow guiding element, since it separates from one another the air streams, which flow parallel through the pressure equalising opening formed in the decompression element and the air discharge opening, in a manner advantageous for the formation of a low-turbulence overall flow.

Furthermore, the stop element can comprise a second section extending substantially parallel to the surface region of the second cabin lining element. The second section of the stop element can, just as the first section of the stop element, have a flow guiding action and thus advantageously affect the formation of low-turbulence air streams through the pressure equalising opening of the decompression element and the air discharge opening.

The decompression arrangement according to the invention can furthermore comprise a sound absorption duct which is arranged, in relation to the direction of the air flow through the air discharge opening in the normal operation of the aircraft, downstream of the air discharge opening. For example, the sound absorption duct can be delimited at least in some sections by the edge region of the first cabin lining element and the edge region of the second cabin lining element. Preferably, the sound absorption duct is lined at least in some sections with a sound absorbing material, such as, for example, a sound absorbing foam material. Noises which arise on the discharge of the air from the aircraft cabin through the air discharge opening can be effectively damped by the sound absorption duct. This advantageously affects the comfort of persons present in the aircraft cabin, such as, for example, passengers and crew members.

The sound absorbing material can partially or completely fill the through-flow cross-section of the sound absorption duct. For example, a sound absorbing material which only partially fills the through-flow cross-section of the sound absorption duct can be applied to a surface of the first cabin lining element facing away from the interior of the aircraft cabin. Such an arrangement enables an effective sound insulation and at the same time is distinguished by a particularly low weight.

Finally, the decompression arrangement according to the invention can comprise a flow directing element which is arranged, in relation to the direction of the air flow through the air discharge opening in the normal operation of the aircraft, downstream of the air discharge opening and extends substantially perpendicular to the direction of the air flow through the air discharge opening. For example, the flow directing element can extend from a surface of the first cabin lining element facing the second cabin lining element in the direction of the second cabin lining element. The flow directing element is then capable of deflecting the air flow by approximately 180°.

BRIEF DESCRIPTION OF THE DRAWINGS

A preferred embodiment of the decompression arrangement according to the invention will now be explained in more detail with reference to the appended schematic drawings, of which

DETAILED DESCRIPTION

Figure 1:
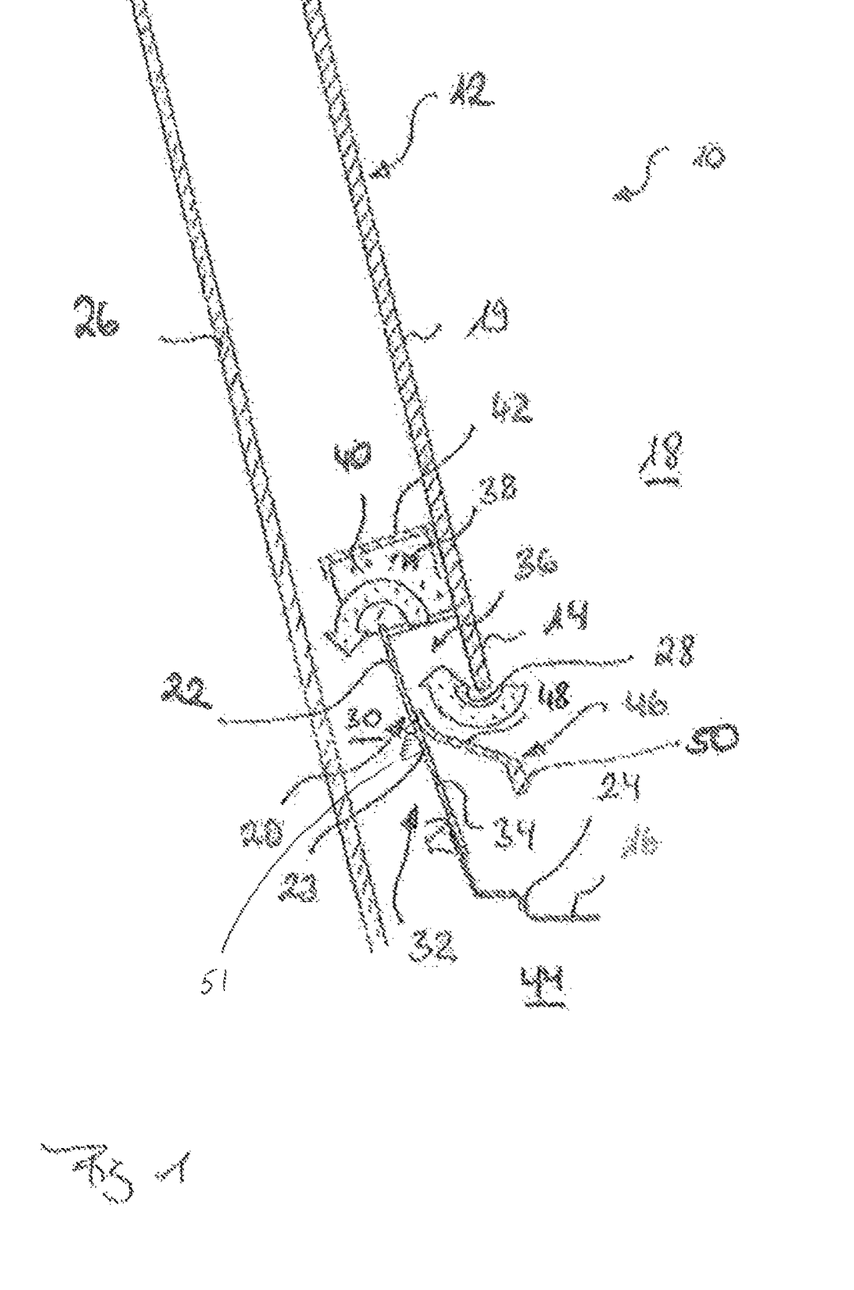
FIG. 1 shows a cross-sectional view of a decompression arrangement for an aircraft in the normal operation of the aircraft.
Figure 2:
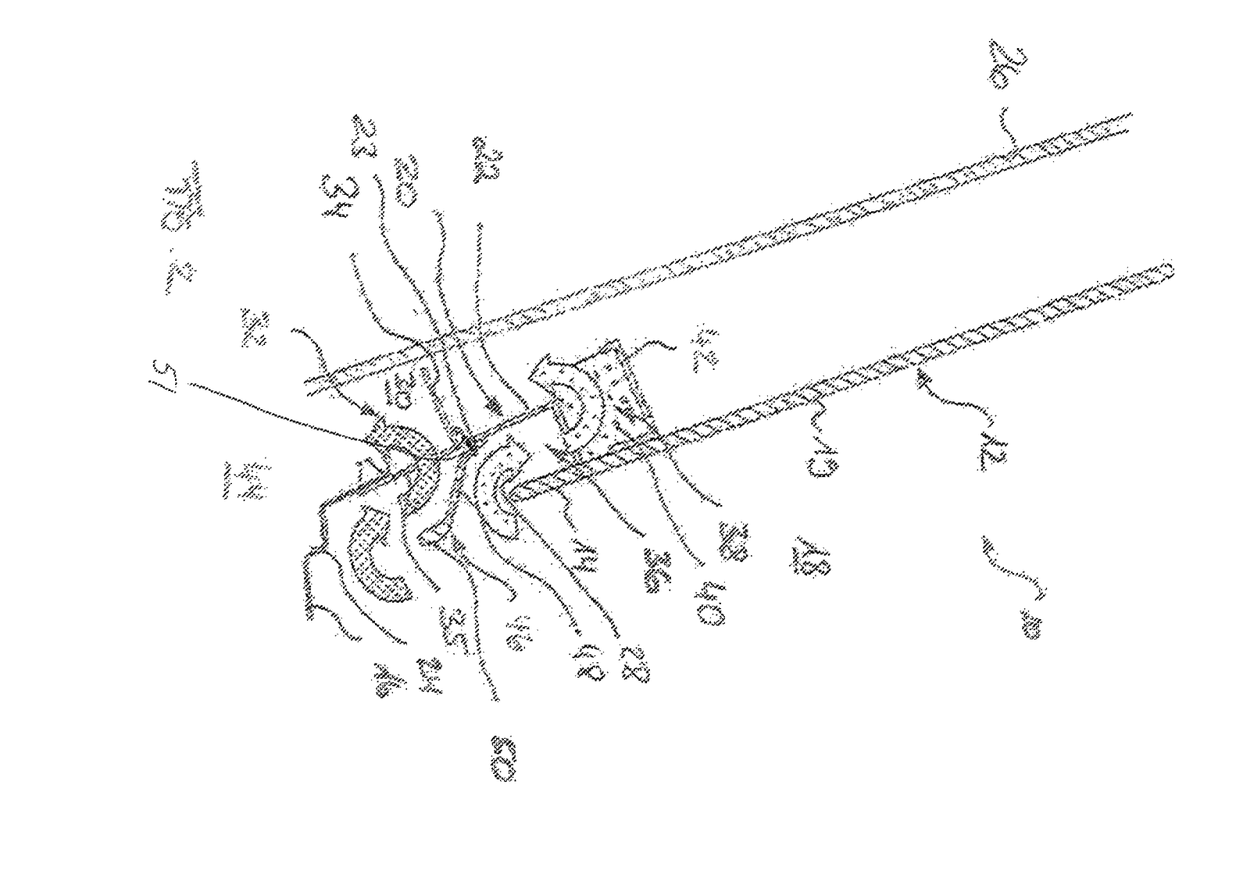
FIG. 2 shows the decompression arrangement according to FIG. 1 in the event of a sudden pressure drop in an aircraft region lying between cabin lining elements and an aircraft outer skin.
Figure 3:
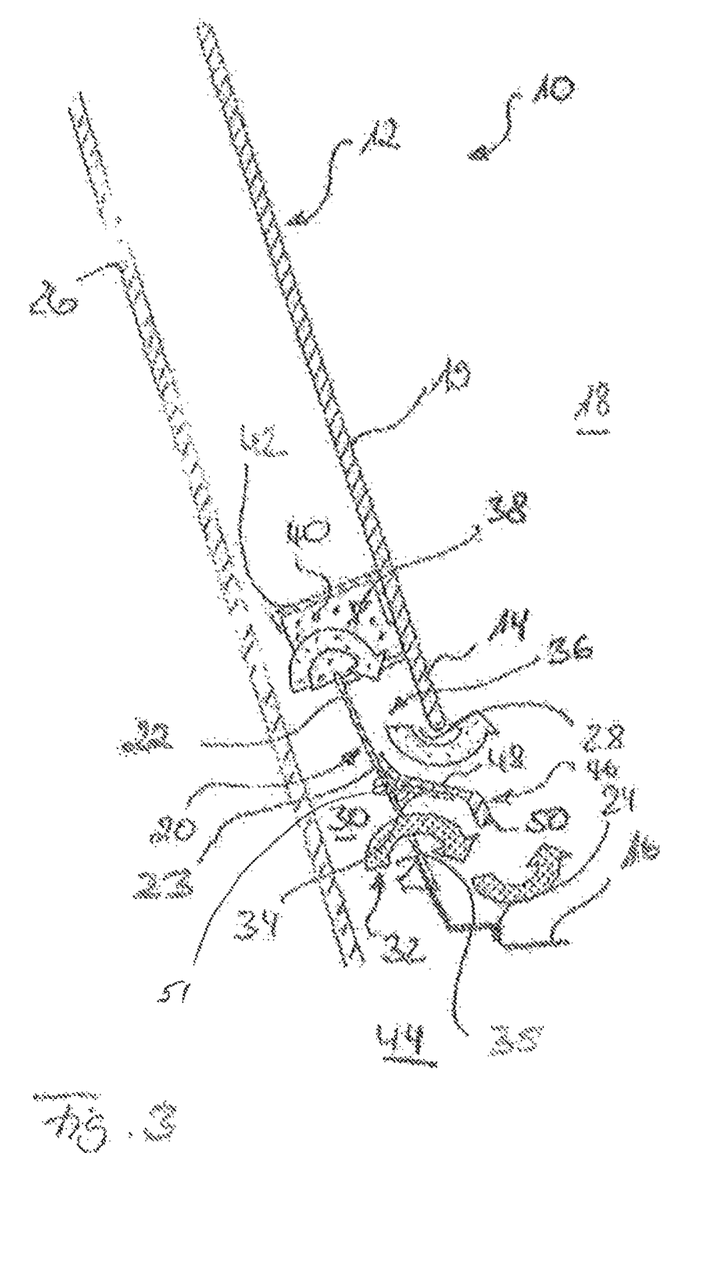
FIG. 3 shows the decompression arrangement according to FIG. 1 in the event of a sudden pressure drop in an inner region of the cabin delimited by the cabin lining elements.

A decompression arrangement 10, illustrated in FIGS. 1 to 3, for use in an aircraft, in particular a passenger aircraft, comprises a first cabin lining element 12 configured in the form of a dado panel. An edge region 14 of the first cabin lining element 12 extends at a distance from a floor 16 of an aircraft cabin 18 which is substantially constant along a longitudinal axis of the aircraft. A surface region 19 of the first cabin lining element 12 extends from the edge region 14 in a first direction, that is to say, in FIGS. 1 to 3, upwards in the direction of a ceiling (not illustrated) of the aircraft cabin 18. Furthermore, the decompression arrangement 10 comprises a second cabin lining element 20 configured in the form of a floor delimiting element. The second cabin lining element 20 reaches behind the first cabin lining element 12, so that an edge region 22 of the second cabin lining element 20, viewed from an interior of the aircraft cabin 18, is positioned behind the edge region 14 of the first cabin lining element 12. A surface region 23 of the second cabin lining element 20 extends from the edge region 22 in a second direction opposite the first direction, that is to say, in FIGS. 1 to 3, downwards in the direction of the aircraft cabin floor 16. An edge 24 of the second cabin lining element 20 facing the interior of the aircraft cabin 18 serves as a guide edge for a carpet to be laid on the floor 16 of the aircraft cabin 18.

The first and the second cabin lining element 12, 20 extend, at least in some sections, substantially parallel to an aircraft outer skin 26. The edge region 22 of the second cabin lining element 20 is, however, arranged at a smaller distance from the aircraft outer skin 26 than the edge region 14 of the first cabin lining element 12. Arranged between the edge region 14 of the first cabin lining element 12 and the edge region 22 of the second cabin lining element 20 is an air discharge opening 28 which serves, in the normal operation of the aircraft illustrated in FIG. 1, to discharge exhaust air from the interior of the aircraft cabin 18 into a region 30 of the aircraft lying between the cabin lining elements 12, 20 and the aircraft outer skin 26.

Finally, the decompression arrangement 10 comprises a decompression element 32. The decompression element 32, which is integrated in the second cabin lining element 20, has a flap 34 which is fastened to the second cabin lining element 20 by means of a fastening device (not illustrated specifically) configured, for example, in the form of a hinge. In the normal operation of the aircraft, shown in FIG. 1, the flap 34 of the decompression element 32 is prestressed by the force of a spring 51 into its closed position, in which it sealingly closes a pressure equalizing opening 35 formed in the decompression element 32. Consequently, in the normal operation of the aircraft, air can be discharged from the aircraft cabin 18 solely through the air discharge opening 28.

The air discharged from the aircraft cabin 18 through the air discharge opening 28 is led, after its entry into the air discharge opening 28, initially through an air discharge duct section 36 delimited by the edge regions 14, 22 of the cabin lining elements 12, 20 and subsequently through a sound absorption duct 38 which extends, in relation to the direction of the air flow through the air discharge opening 28 in the normal operation of the aircraft, downstream of the air discharge duct section 36. The sound absorption duct 38 is lined with a sound absorbing material 40, such as, for example, a foam material. In the normal operation of the aircraft, the sound absorption duct 38 ensures effective damping of the noises which occur on the discharge of exhaust air from the aircraft cabin 18 through the air discharge opening 28 and thus an increase in the comfort of persons present in the aircraft cabin 18.

As it flows through the sound absorption duct 38, the air flow which, in the normal operation of the aircraft, is discharged from the aircraft cabin 18 via the air discharge opening 28 is deflected by approximately 180°. For this purpose, there is provided a flow directing element 42 which is arranged, in relation to the direction of the air flow through the air discharge opening 28 in the normal operation of the aircraft, downstream of the air discharge duct section 36. The flow directing element 42 is configured in the form of a deflecting plate and is fastened to a surface of the first cabin lining element 12 facing away from the aircraft cabin 18. In order to bring about correct deflection of the air flow, exiting from the air discharge duct section 36, by approximately 180°, the flow directing element 42 extends substantially perpendicularly to the direction of the air flow through the air discharge opening 28 and the air discharge duct section 36. In the normal operation of the aircraft, the air flow deflected by the flow directing element 42 is initially led through the region 30 of the aircraft lying between the cabin lining elements 12, 20 and the aircraft outer skin 26 and from there finally discharged into an underfloor region 44 of the aircraft.

In the event of a pressure drop in the region 30 of the aircraft lying between the cabin lining elements 12, 20 and the aircraft outer skin 26, the flap 34 of the decompression element 32 is, by contrast, pivoted about an axis A in a first direction, that is to say in the direction of the aircraft outer skin 26, into a first open position, illustrated in FIG. 2, in which it opens the pressure equalizing opening 35 formed in the decompression element 32. In particular, the flap 34 pivots into its first open position as soon as a first differential pressure, acting on the decompression element 32 as a result of the pressure drop in the region 30 lying between the cabin lining elements 12, 20 and the aircraft outer skin 26, exceeds the spring 51 prestressing force which is applied to the flap 34 by the spring 51 prestressing the flap 34 into its closed position. By appropriate design of the spring 51, it is thus possible to set in a simple manner the predetermined first differential pressure from which the flap 34 of the decompression element 32 pivots into its first open position and opens the pressure equalizing opening 35 formed in the decompression element 32.

In the event of a pressure drop in the region 30 of the aircraft lying between the cabin lining elements 12, 20 and the aircraft outer skin 26, air can thus be discharged from the interior of the aircraft cabin 18 both through the air discharge opening 28 and through the pressure equalising opening 35. This allows a rapid pressure equalisation between the interior of the aircraft cabin 18 and the region 30 of the aircraft lying between the cabin lining elements 12, 20 and the aircraft outer skin 26. As a result, in the event of decompression, damage to the cabin lining elements 12, 20 and the floor structure is reliably avoided. The air discharged from the interior of the aircraft cabin 18 via the air discharge opening 28 and the pressure equalising opening 35 in the event of decompression, shown in FIG. 2, is finally led away into the underfloor region 44 of the aircraft in similar fashion to that in the normal operation of the aircraft.

If a sudden pressure drop occurs in the interior of the aircraft cabin 18 delimited by the cabin lining elements 12, 20, the flap 34 of the decompression element 32 is pivoted about the axis A into a second opening position, illustrated in FIG. 3. In its second open position, the flap 34 likewise opens the pressure equalizing opening 35 formed in the decompression element 32. In the event of a pressure drop in the interior of the aircraft cabin 18 delimited by the cabin lining elements 12, 20, the flap 34 is, however, not pivoted in the first direction, that is to say in the direction of the aircraft outer skin 26 but in a second direction opposite the first direction, that is to say in the direction of the first cabin lining element 12. Once again, the flap 34 pivots into its second position as soon as the differential pressure, acting on the decompression element 32 as a result of the pressure drop in the inner region of the aircraft cabin 18 delimited by the cabin lining elements 12, 20, exceeds the spring 51 prestressing force which is applied to the flap 34 by the spring 51 prestressing the flap 34 into its closed position.

When the flap 34 is in its second open position, it forms an angle >90° with the edge region 22 of the second cabin lining element 20. In the embodiment of a decompression arrangement 10 shown in the figures, the angle formed between the edge region 22 of the second cabin lining element 20 and the flap 34 in its second open position is approximately 120'. Moreover, the axis A about which the flap 34 is pivotable from its closed position into its first or its second open position is arranged in the surface region 23 of the second cabin lining element adjoining the edge region 22 of the second cabin lining element 20. This design feature of the decompression arrangement 10 ensures that the flap 34 of the decompression element 32 does not project in its second open position into the air discharge opening 28 arranged between the edge regions 14, 22 of the cabin lining elements 12, 20. The through-flow cross-section of the air discharge opening 28 thus remains unaffected, even when the flap 34 of the decompression element 32 is in its second open position.

In the event of a pressure drop in the inner region of the aircraft cabin 18 delimited by the cabin lining elements 12, 20, air can thus be led from the region 30 of the aircraft lying between the cabin lining elements 12, 20 and the aircraft outer skin 26 both through the pressure equalising opening 35 formed in the decompression element 32 and through the air discharge opening 28 into the inner region of the aircraft cabin 18 delimited by the cabin lining elements 12, 20. In other words, in the compression arrangement 10, even when the flap 34 of the decompression element 32 is in its second open position, the full through-flow cross-section of the air discharge opening 28 can be utilised in order to lead additionally air from the region 30 of the aircraft lying between the cabin lining elements 12, 20 and the aircraft outer skin 26 into the inner region of the aircraft cabin 18 affected by the decompression. This allows a rapid pressure equalisation between the region 30 of the aircraft lying between the cabin lining elements 12, 20 and the aircraft outer skin 26, and the interior of the aircraft cabin 18, without overdimensioning of the pressure equalising opening 35 or of the air discharge opening 28 being required for this purpose.

In the embodiment of a decompression arrangement 10 shown in the figures, the flap 34 of the decompression element 32 cooperates in its second open position with a stop element 46 which is fastened to the second cabin lining element 20 and comprises a first section 48 extending from the second cabin lining element 20 in the direction of the first cabin lining element 12. The stop element 46 defines the second open position of the flap 34, that is to say it ensures that the flap 34 cannot pivot in an uncontrolled manner beyond the desired second open position in the direction of the first cabin lining element 12. By an appropriate design of the hinge serving to fasten the flap 34 to the second cabin lining element 20 and/or appropriate design of the spring 51 prestressing the flap 34 into its closed position, it is, however, also possible to fix the second open position of the flap 34 in such a manner the stop element 46 can be dispensed with.

The first section 48 of the stop element 46 forms an angle >90" with the edge region 22 of the second cabin lining element 20, so that the flap 34 of the decompression element 32 is oriented in its second open position substantially parallel to the first section 48 of the stop element 46. Furthermore, the stop element 46 has a second section 50 extending substantially parallel to the surface region 23 of the second cabin lining element 20. In the normal operation of the aircraft, the stop element 46 thus acts as a flow guiding element which guides the air from the interior of the aircraft cabin 18 in the direction of the air discharge opening 28.

In the event of decompression, the stop element 46, by contrast, subdivides the air streams flowing through the pressure equalising opening 35 and the air discharge opening 28 into two independent partial streams. In a decompression arrangement 10 which is not equipped with a stop element 46, this flow dividing function would be assumed by the flap 34 in its second open position. In particular, in the event of a pressure drop in the region 30 of the aircraft lying between the cabin lining elements 12, 20 and the aircraft outer skin 26, the stop element 46 guides the air stream, discharged from the interior of the aircraft cabin 18 through the air discharge opening 28 into the region 30 of the aircraft lying between the cabin lining elements 12, 20 and the aircraft outer skin 26, along its surface, facing the first cabin lining element 1 in the direction of the air discharge opening 28. An air stream discharged from the interior of the aircraft cabin 18 through the pressure equalising opening 35 into the region 30 of the aircraft lying between the cabin lining elements 12, 20 and the aircraft outer skin 26 is, by contrast, guided along a surface of the stop element, facing away from the first cabin lining element 12, in the direction of the pressure equalising opening 35.

in the event of a pressure drop in the inner region of the aircraft cabin 18, the stop element 46 guides the air stream, discharged from the region 30 of the aircraft lying between the cabin lining elements 12, 20 and the aircraft outer skin 26 through the air discharge opening 28 into the interior of the aircraft cabin 18, by contrast, along its surface, facing the first cabin lining element 12, away from the air discharge opening 28. An air stream, discharged from the region 30 of the aircraft lying between the cabin lining elements 12, 20 and the aircraft outer skin 26 through the pressure equalising opening 35 into the interior of the aircraft cabin 18, is, by contrast, guided along the surface of the stop element, facing away from the first cabin lining element 12, in the direction of the pressure equalising opening 35. These flow guiding functions of the stop element 46 may, however, also be at least partially fulfilled by the flap 34 in its second open position.

What is claimed is:

1. A decompression arrangement for an aircraft, comprising:
    a first cabin lining element that extends, in at least some sections, substantially parallel with an aircraft outer skin and includes a lower edge region provided at a distance from a floor of the aircraft, wherein the first cabin lining element extends from the lower edge region generally upwardly in a direction of a ceiling of the aircraft;
    a second cabin lining element positioned between the first cabin lining element and the aircraft outer skin, wherein the second cabin lining element includes an upper edge region positioned between the lower edge region of the first cabin lining element and the aircraft outer skin, and wherein the second cabin lining element extends downwardly from the upper edge region in a direction of the floor of the aircraft, wherein the first and second cabin lining elements delimit an inner region of a cabin of the aircraft;
    an air discharge opening, which is arranged between the lower edge region of the first cabin lining element and the upper edge region of the second cabin lining element and which is adapted, in the normal operation of the aircraft, to discharge air from the inner region of the cabin into a region of the aircraft lying between the first and second cabin lining elements and the aircraft outer skin; and
    a decompression element, which is integrated in the second cabin lining element and has a flap which, in a closed position, closes a pressure equalizing opening formed in the decompression element,
    wherein the flap is configured to, if a first predetermined differential pressure acts on the decompression element, pivot about an axis in a first direction from the closed position into a first open position, wherein in the first open position the flap opens the pressure equalizing opening formed in the decompression element,
    wherein the flap is configured to, if a second predetermined differential pressure acts on the decompression element, pivot about the axis in a second direction opposite the first direction into a second open position, wherein in the second open position the flap opens the pressure equalizing opening formed in the decompression element, and
    wherein the decompression element is positioned relative to the first and the second cabin lining elements in such a manner that the flap in its second open position keeps clear a through-flow cross-section of the air discharge opening.

2. The decompression arrangement according to claim 1, wherein the axis about which the flap of the decompression element is pivotable from its closed position into the first and second open positions is arranged in the second cabin lining element in parallel with the upper edge region of the second cabin lining element.

3. The decompression arrangement according to claim 1, wherein the flap of the decompression element forms, in its second open position, an angle greater than 90° with a region of the second cabin lining element located above the axis about which the flap pivots.

4. The decompression arrangement according to claim 1, wherein the flap of the decompression element is prestressed by means of at least one spring into its closed position, in which it closes the pressure equalizing opening formed in the decompression element.

5. The decompression arrangement according to claim 3, wherein the flap of the decompression element cooperates in its second open position with a stop element,
    wherein the stop element comprises:
        a first section provided to the region of the second cabin lining element located above the axis about which the flap pivots; and
        a second section that extends from the first section of the stop element downwardly toward the floor of the aircraft and toward the inner region of the cabin.

6. The decompression arrangement according to claim 5, wherein the first section of the stop element is fastened to the second cabin lining element.

7. The decompression arrangement according to claim 6, wherein the second section of the stop element forms an angle greater than 90° with a region of the second cabin lining element located above the first section of the stop element.

8. The decompression arrangement according to claim 1, wherein a sound absorption duct is arranged, in relation to the direction of the air flow through the air discharge opening in the normal operation of the aircraft, downstream of the air discharge opening and is lined at least in some sections with a sound absorbing material.

9. The decompression arrangement according to claim 1, wherein a flow directing element is arranged, in relation to the direction of the air flow through the air discharge opening in the normal operation of the aircraft, downstream of the air discharge opening and extends substantially perpendicular to the direction of the air flow through the air discharge opening.

10. A decompression arrangement for an aircraft, comprising:
- a first cabin lining element that extends, in at least some sections, substantially parallel with an aircraft outer skin and includes a lower edge region provided at a distance from a floor of the aircraft, wherein the first cabin lining element extends from the lower edge region generally upwardly in a direction of a ceiling of the aircraft;
- a second cabin lining element positioned between the first cabin lining element and the aircraft outer skin, wherein the second cabin lining element includes an upper edge region positioned between the lower edge region of the first cabin lining element and the aircraft skin, and wherein the second cabin lining element extends downwardly from the upper edge region in a direction of the floor of the aircraft;
- an air discharge opening, which is arranged between the lower edge region of the first cabin lining element and the upper edge region of the second cabin lining element and which is adapted, in the normal operation of the aircraft, to discharge air from an inner region of the cabin into a region of the aircraft lying between the cabin lining elements and the aircraft outer skin; and
- a decompression element, which is provided in the second cabin lining element and comprises:
- a flap which, in a closed position, closes a pressure equalizing opening formed in the decompression element, wherein the flap is configured to:
  - if a first predetermined differential pressure acts on the decompression element, pivot about an axis in a first direction from the closed position into a first open position, wherein in the first open position the flap opens the pressure equalizing opening formed in the decompression element;
  - if a second predetermined differential pressure acts on the decompression element, pivot about the axis in a second direction opposite the first direction into a second open position, wherein in the second open position the flap opens the pressure equalizing opening formed in the decompression element; and
  - cooperate in the second position with a stop element provided to the second cabin lining element that defines the second open position of the flap such that the flap in its second open position keeps clear a through-flow cross-section of the air discharge opening.

* * * * *